US008379071B2

(12) United States Patent
Katayama

(10) Patent No.: US 8,379,071 B2
(45) Date of Patent: Feb. 19, 2013

(54) LINERLESS LABEL ROLL-UP PREVENTING DEVICE OF THERMAL PRINTER

(75) Inventor: Tamotsu Katayama, Tokyo (JP)

(73) Assignees: Kabushiki Kaisha Sato (JP); Kabushiki Kaisha Sato Chishiki Zaisan Kenkyusyo (JP)

( * ) Notice: Subject to any disclaimer, the term of this patent is extended or adjusted under 35 U.S.C. 154(b) by 13 days.

(21) Appl. No.: 12/991,276

(22) PCT Filed: Aug. 26, 2009

(86) PCT No.: PCT/JP2009/004140
§ 371 (c)(1), (2), (4) Date: May 6, 2011

(87) PCT Pub. No.: WO2011/013183
PCT Pub. Date: Feb. 3, 2011

(65) Prior Publication Data

US 2011/0211034 A1 Sep. 1, 2011

(30) Foreign Application Priority Data

Jul. 30, 2009 (JP) ................................ 2009-177986

(51) Int. Cl.
*G01D 15/10* (2006.01)

(52) U.S. Cl. ...................................................... 347/220

(58) Field of Classification Search .................. 347/220, 347/222, 197, 198; 400/619, 644
See application file for complete search history.

(56) References Cited

U.S. PATENT DOCUMENTS 5,674,345 A 10/1997 Nash
7,186,043 B2 3/2007 Keller

FOREIGN PATENT DOCUMENTS

JP 6-080131 A 3/1994
JP 6-328794 A 11/1994
JP 2005-047196 2/2005

OTHER PUBLICATIONS

International Search Report dated Dec. 8, 2009, issued in corresponding international application No. PCT/JP2009/004140.

*Primary Examiner* — Kristal Feggins
(74) *Attorney, Agent, or Firm* — Ostrolenk Faber LLP

(57) ABSTRACT

A linerless label roll-up preventing device for a thermal printer that prevents roll-up of the linerless label 3 on the platen roller 13. A roll-up preventing plate 23 is applied to a slit (22) formed in the outer surface of the platen roller (13), and protrudes to form a roll-up preventing edge (29) at a portion of the roll-up prevention plate (23). A roll-up preventing plate 23 being fixed to a slit (22), formed in the radial surface of the platen roller (13), relatively to the platen roller (13), and formed with a roll-up preventing projection edge, at a portion of the roll-up preventing plate (23), projecting out slightly from the outer circumferential surface of the platen roller (13) and capable of contacting the back surface of the linerless label (3).

8 Claims, 4 Drawing Sheets

LINERLESS LABEL ROLL-UP PREVENTING DEVICE OF THERMAL PRINTER

CROSS REFERENCE TO RELATED APPLICATION(S)

The present application is a 35 U.S.C. §371 national phase conversion of PCT/JP2009/004140 filed Aug. 26, 2009, which claims priority of Japanese Patent Application No. 2009-177986, filed Jul. 30, 2009 the content of which is incorporated herein by reference.

BACKGROUND OF THE INVENTION

The present invention relates to a linerless label roll-up preventing device of a thermal printer and which particularly performs printing by loading a linerless label.

A strip-form label sheet is known which uses a linerless label to save resources. A wireless label does not use a liner (or peeling sheet) that is temporarily attached to an adhesive layer on the back surface of the label base member. Printers for such a linerless label have also been developed.

FIG. 4 is a schematic side-view of a thermal printer 1, which is an example of a conventional linerless label printer. The thermal printer 1 is, for example, configured to be portable. It has a printer housing 2, a label sheet holding and supplying unit 4 holding a linerless label sheet 3 in a roll, an internal transfer route 5, and a printing unit 6.

A belt 7 on the printer housing 2 makes the thermal printer 1 portable, to be carried for example, on the waist W of an operator.

The linerless label 3, as shown enlarged in FIG. 4*a*, has a strip-form label base member 8, an adhesive layer 9 formed on the back surface of the label base member 8, a lower layer thermal color forming agent layer 10 and an upper layer separating agent layer 11 formed on the surface of the label base member 8.

Therefore, if the linerless label sheet 3 is loaded in a roll form at the holding and supplying unit 4, since the separating agent layer 11 is contacting the adhesive agent layer 9, the inner layer side and the outer layer side of the roll will not adhere to each other, which enables feed out of the rolled linerless label 3 in a strip-form to the transfer route 5.

Furthermore, perforations (not shown in the diagram) at a predetermined pitch along the linerless label 3, enable cutting the printed linerless label 3 in a predetermined size.

The printing unit 6 has a thermal head 12 and an opposing platen roller 13. The printing unit 6 supplies the linerless label sheet 3 between the thermal head 12 and the platen roller 13, and transfers the linerless label sheet 3 by the rotating drive of the platen roller 13 such that it is possible to perform printing of a predetermined contents on the surface of the label base member 8.

Furthermore, the thermal head 12 is provided at the printer housing 2, and the platen roller 13 is provided rotatably at an end portion of an openable cover 15 around an opening-closing shaft 14 fixed on the printer housing 2.

The linerless label sheet 3 printed at the printing unit 6 is discharged outside of the printer housing 2 from the label outlet 16 of the printer housing 2, cut at the perforations of the label sheet, and attached to the predetermined portion.

In the thermal printer 1 having such a configuration, the parts of the transfer route 5 and the platen roller 13, etc., which contact the adhesive agent layer 9 at the back surface of the linerless label 3, are ensured of non-adhesiveness by themselves, by the use of necessary separable material or by being provided with surface preparation such that the surface has detachability (non-adhesiveness). For example, silicone rubber is used for the platen roller 13.

However, in prolonged use of the thermal printer 1 by its continuous use, the non-adhesiveness of the platen roller 13 will deteriorate, so the adhesive agent (adhesive paste) of the adhesive agent layer 9 gradually infiltrates into the platen roller 13, and furthermore, the adhesive agent adheres to the platen roller 13. Particularly as shown by the virtual line in the drawing, the printed linerless label sheet 3 is not transferring in the outlet 16 direction, but with the rotation of the platen roller 13, the printed linerless label 3 is adhering to the outer circumferential surface of the platen roller 13. This causes a problem in issuance and discharge of the linerless label 3 since the label is being rolled-up around the outer circumferential surface of the roller 13.

SUMMARY OF THE INVENTION

Technical Problem

The present invention has been made in view of the aforementioned problems. The object of the present invention is to provide a linerless label sheet roll-up preventing device of a thermal printer which is not affected by the deterioration of non-adhesiveness of the platen roller due to its continuous usage and by the adhesiveness of the adhesive agent of the linerless label, and which is capable of preventing the roll-up of the linerless label sheet on the platen roller.

Another object of the present invention is to provide a linerless label sheet roll-up preventing device of a thermal printer which ensures stable transfer of the linerless label sheet at the platen roller portion.

Another object of the present invention is to provide a linerless label sheet roll-up preventing device of a thermal printer which is capable of forcibly peeling off the linerless label adhered to and rolled-up on the outer circumferential surface of the platen roller.

Yet another object of the present invention is to provide a linerless label roll-up preventing device of a thermal printer which is capable of utilizing a common platen roller independent of the type of the adhesive agent of the linerless label, without employing an exclusive or a new platen roller which has been enhanced to improve the non-adhesiveness of the platen roller, and by employing the conventional parts as they are.

Solution to Problem

The present invention focuses on forming slits of small width extending in the radial direction of the platen roller, attaching a sheet roll-up preventing plate at or to the slits, and forming protruding roll-up preventing projections at a portion of the roll-up preventing plate enabling the projection to contact the adhesive agent layer side of the linerless label. A first aspect of the present invention includes: a linerless label roll-up preventing device of a thermal printer. The printer supplies a linerless label. It comprises a sheet formed with an adhesive agent layer on the back side of a label base member and a separating agent layer on the surface of the label base member and when it is passed between a thermal head and a platen roller, transfers the linerless label by rotation of the platen roller, and prints a predetermined content on the surface of the label base member. The linerless label roll-up preventing device comprises a roll-up preventing plate fixed at a slit, which is formed in the radial surface of the platen roller, relative to the rotating platen roller. The plate is formed with a roll-up preventing projecting edge at a portion of the roll-up preventing plate, which projects out slightly from the outer circumferential surface of the platen roller, and is capable of contacting the back surface of the linerless label.

The roll-up preventing plate may be provided with an arcuate fitting portion, which is fitted to a rotating shaft of the platen roller, while ensuring rotation of the rotating shaft. The arcuate fitting portion forms at its exterior portion the roll-up preventing projection edge, such that it is located at a downstream side of the contacting portion of the thermal head and the platen roller, but still between the thermal head and the platen roller. A pair of right and left fixing ends, which are located at both ends of the arcuate fitting portion, fix the roll-up preventing plates relatively to the platen roller.

A first fixing end projects out from the outer circumferential surface of the platen roller in a direction different from the projecting direction of the roll-up preventing projection edge, and is configured for preventing forward direction rotation of the roll-up preventing plate against the forward direction rotation of the platen roller. A second fixing end projects from the outer circumferential surface of the platen roller in a direction different from the projecting direction of the roll-up preventing projection edge, and is configured for preventing counter rotation of the roll-up preventing plate against the counter rotation of the platen roller.

The roll-up preventing projection edge can be provided with a roll-up preventing contacting surface along a transfer direction of the linerless label between the thermal head and the platen roller.

The radical direction slit in the platen roller may possibly reach the outer circumferential surface of the rotating shaft of the platen roller from the outer circumferential surface of the platen roller.

A pair of the slits is formed axial at positions evenly located on right and left sides of the platen roller in the axial direction, and a pair of the roll-up preventing plates can be provided at the respective slits.

The roll-up preventing plates are preferably configured with plastic members (such as polyacetal resin, etc.) having resistance to fatigue, resistance to deformation, resistance to abrasion, and resistance to heat, as well as detachability.

On the surface of the label base member, it is desirable to form a thermal color forming agent layer on the lower layer of the separating agent layer, and perform printing by the thermal head.

Advantageous Effects of Invention

In a linerless label roll-up preventing device of a thermal printer of the present invention, the roll-up preventing plates are attached at the roll-up preventing slits formed in the radial surface of the platen roller. The plates protrude to form the roll-up preventing projection edges which are capable of contacting the adhesive agent layer side of the linerless label at a portion of the roll-up preventing plates. Since the linerless label is transferred between the thermal head and the platen roller where the label is then printed, the label contacts the roll-up preventing projection edges, and is forcibly detached from the outer circumferential surface of the platen roller by running on to the roll-up preventing edges from the outer circumferential surface of the platen roller, and is guided to the direction of the outlet. By eliminating the influence from the deterioration of the non-adhesiveness of the platen roller and the adhesive agent of the linerless label, a stable transfer, issuance, and discharge of the linerless label can be achieved.

DESCRIPTION OF THE EMBODIMENTS

The present invention concerns a linerless label roll-up preventing device of a thermal printer which is capable of stable transfer of the linerless label by preventing roll-up of the linerless label on the platen roller, through forcible peeling action of the linerless label by a roll-up preventing projection edge protrudingly formed at a part of a roll-up preventing plate.

Hereinafter, a linerless label roll-up preventing device of a thermal printer that is an embodiment of the present invention will be explained based on FIGS. 1 through 3. The same reference numbers are used for elements which are the same as those in FIG. 4, and detailed explanation of such element will be omitted.

Figure 1:
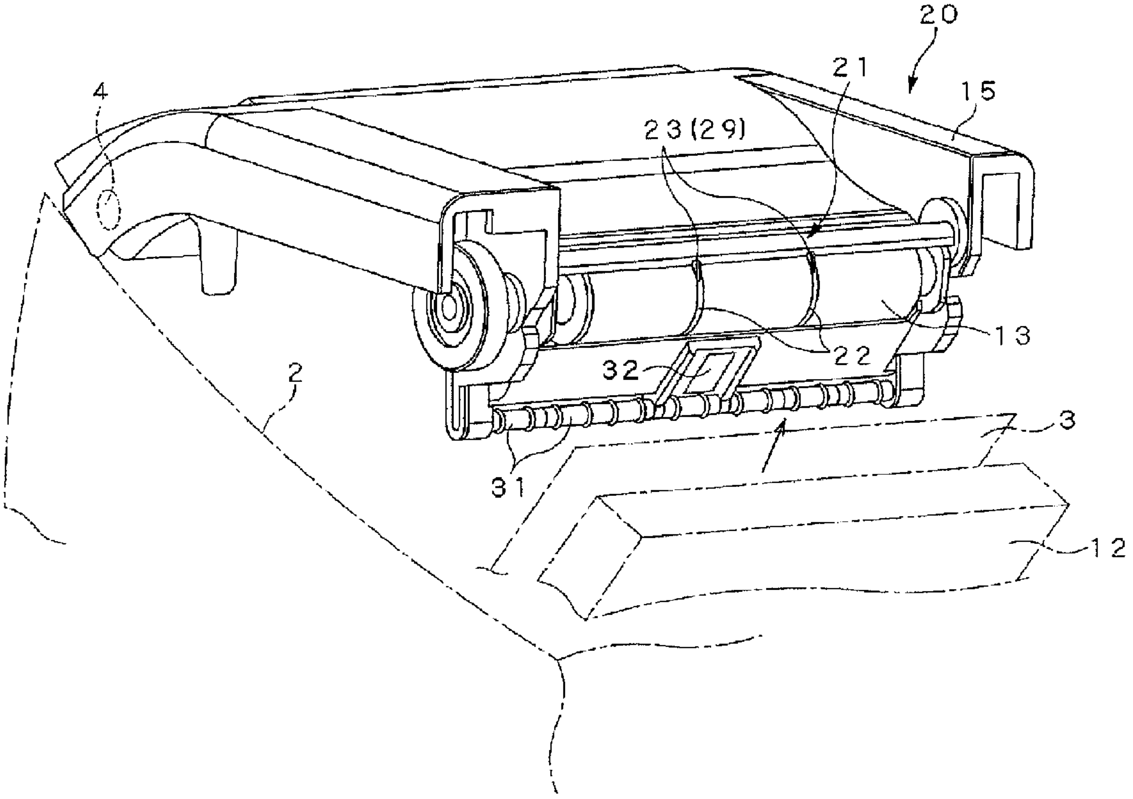
FIG. 1 is a perspective view of the cover 15 of the thermal printer 20 equipped with the linerless label roll-up preventing device 21 according to an embodiment of the present invention.

FIG. 1 is a perspective view of the cover 15 (FIG. 4) of a thermal printer 20. The thermal printer 20, like the aforementioned thermal printer 1 (FIG. 4), has a printer housing 2, a supplying and holding unit 4, a transfer route 5, a printing unit 6, and a cover 15, and also a roll-up preventing device 21 of a linerless label 3 at part of the printing unit 6.

The roll-up preventing device 21 of the linerless label 3 comprises a pair of right and left slits 22 having small width and formed in the radial or peripheralsurface (in the surface perpendicular to the axial direction) of a platen roller 13 which is attached rotatably at the end portion of an openable cover 15.

Figure 2:
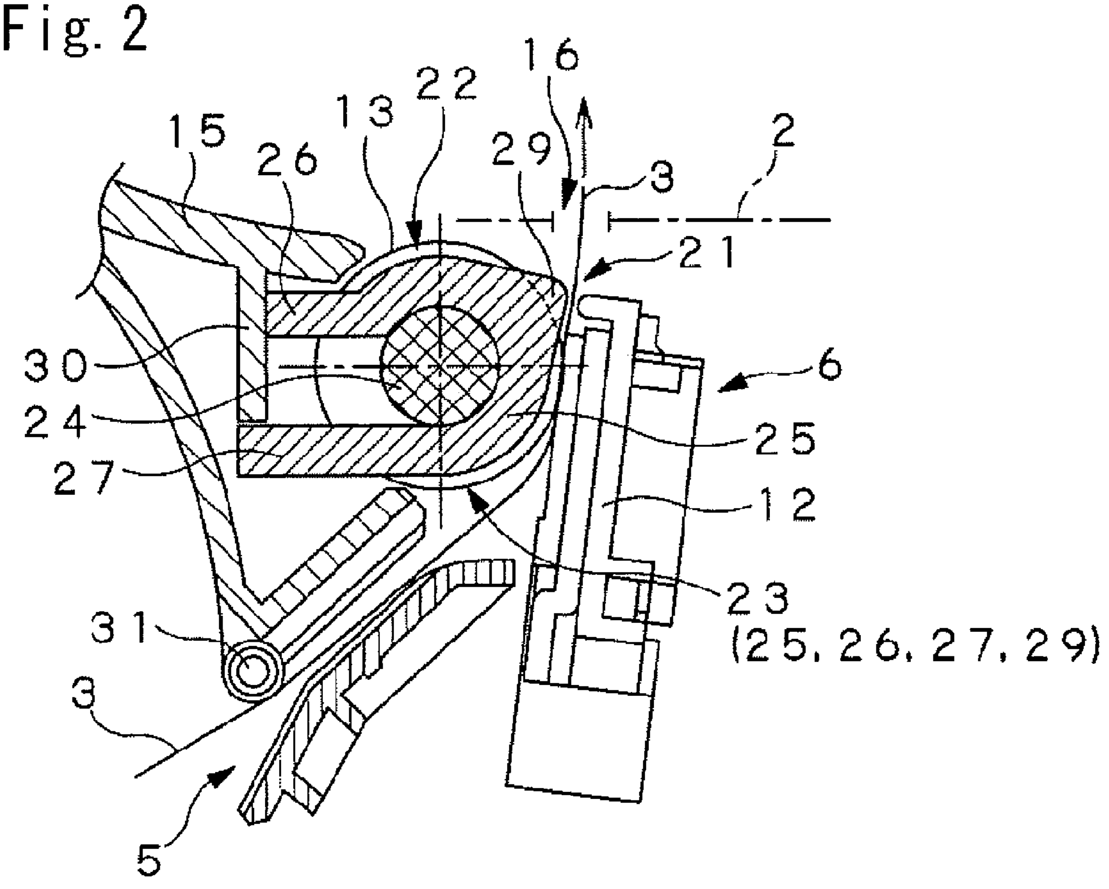
FIG. 2 is a longitudinal sectional view of the linerless label roll-up preventing device 21 according to the embodiment of the present invention.
Figure 3:
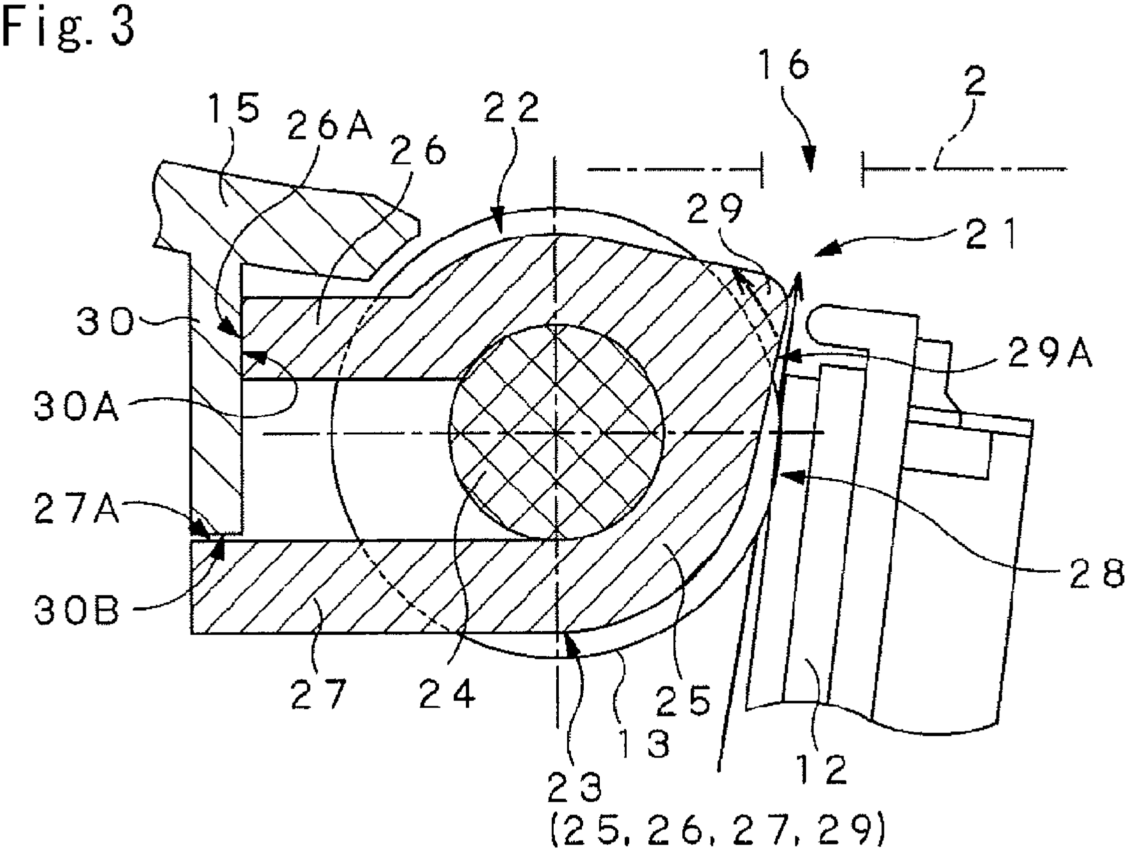
FIG. 3 is an enlarged sectional view of the linerless label roll-up preventing device 21 according to the embodiment of the present invention.
Figure 4:
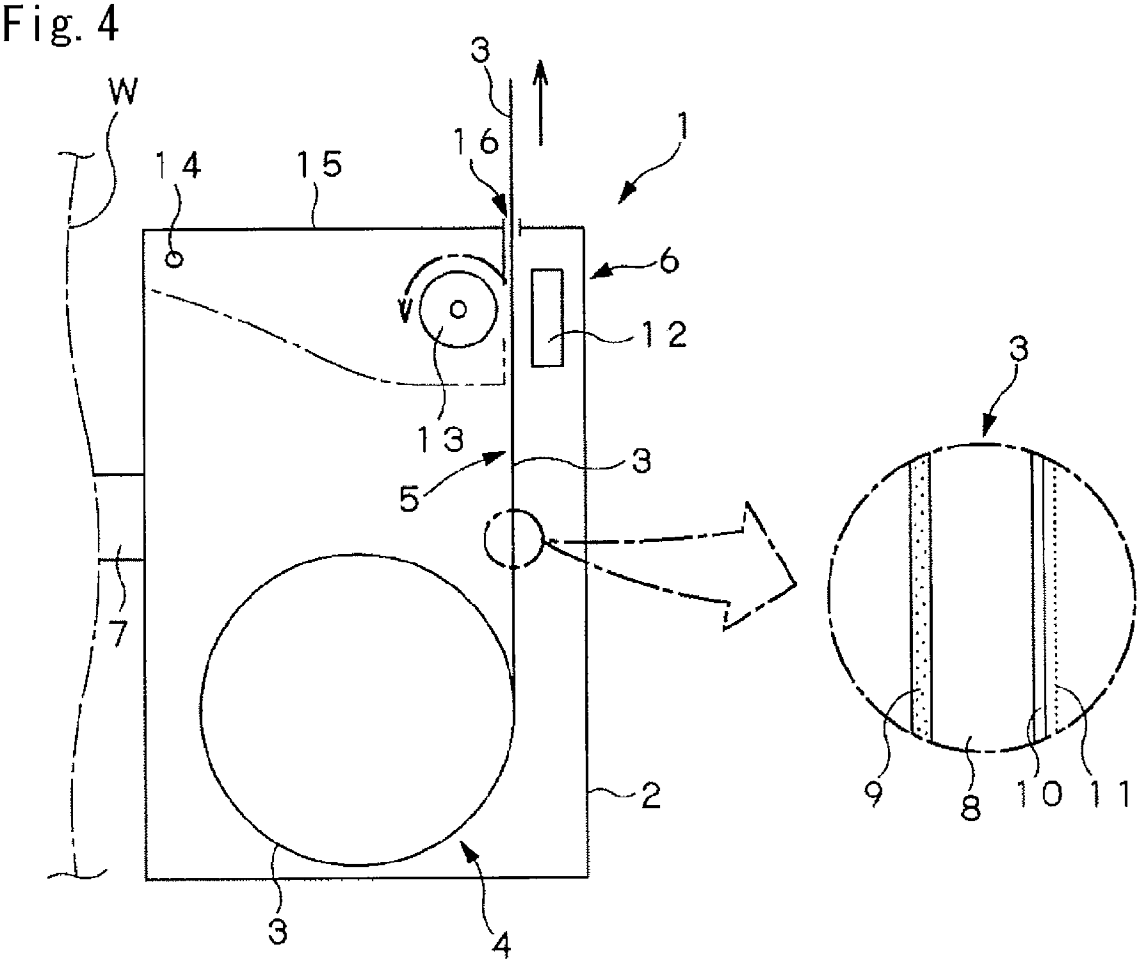
FIG. 4 is a schematic side view of the conventional printer (thermal printer 1) of a linerless label.

FIG. 2 is a transverse sectional view of the linerless label roll-up preventing device 21 and FIG. 3 is an enlarged sectional view of the linerless label roll-up preventing device 21. Roll-up preventing plates 23 are provided at the slits 22 of the platen roller 13. The plates are fixed relative to the rotating platen roller 13.

Each slit 22 extends between the outer circumferential surface of a rotating shaft 24 of the platen roller 13 and the outer circumferential surface of the platen roller 13 The slit is formed the over the entire circumference of the rotating shaft 24.

Furthermore, a pair of the slits 22 are axially spaced apart at positions evenly located toward the right and left sides of the platen roller in the axial direction (symmetrically to the center portion lengthwise of the platen roller 13). A respective pair of the roll-up preventing plates 23 is provided at the slits 22 respectively.

The roll-up preventing plate 23 has an arcuate fitting portion 25 and a pair of right and left fixing ends, a first fixing end 26 and a second fixing end 27.

A non-rotating, arcuate fitting portion 25 is fitted to the rotating shaft 24 without preventing the rotation of the platen roller 13. On the exterior portion of the fitting portion 25 is a roll-up preventing edge 29 which is approximately in an isosceles triangle shape, located at a downstream side (outlet 16 direction side) from a contacting portion 28 of the thermal head 12 and the platen roller 13.

The roll-up preventing edge 29 has a roll-up preventing contacting surface 29A along the transfer direction of the linerless label between the thermal head 12 and the platen roller 13. The edge 29 projects slightly from the outer circumferential surface of the platen roller 13 at a portion of the roll-up preventing plate 23, and it contacts the back surface (adhesive agent layer 9) of the linerless label 3.

The first fixing end 26 and the second fixing end 27, located at both ends of the arcuate fitting portions 25, relatively fix the roll-up preventing plate 23 to the platen roller 13.

The first fixing end 26 projects out from the outer circumferential surface of the platen roller 13 in a first direction (left in FIGS. 2 and 3) which is different from the projecting direction of the roll-up preventing projection edge 29. The first end portion 26 prevents forward direction rotation of the roll-up preventing plate 23 countering the forward direction rotation (transfer direction rotation) of the platen roller 13.

The second fixing end 27 also projects out from the outer circumferential surface of the platen roller 13 in a second direction (left in FIG. 3 and above fixing end 26), which direction is different from the projecting direction of the roll-up preventing projection edge 29, and the end 27 prevents counter rotation of the roll-up preventing plate 23 against the counter rotation (reverse transfer direction rotation) of the platen roller 13.

As shown in FIG. 3, the first fixing end 26, by the side bottom portion 26A abuts with a first stopper surface 30A of the stopper bracket 30 of the cover 15, controls the rotating movement of the roll-up preventing plate 23 around the rotating shaft 24, in a counterclockwise rotation in the diagram (forward transfer direction of the linerless label).

The second fixing end 27, which is slightly longer than the first fixing end 26, by its inner side portion 27A abutting a second stopper surface 30B of the stopper bracket 30 of the cover 15, controls the rotating movement of the roll-up preventing plate 23 around the rotating shaft 24, in a clockwise rotation (counter transfer direction of the linerless label).

As shown in FIG. 1, at the upstream side of the platen roller 13 on the cover 15, there are a plurality of guide rollers 31, such that the linerless label 3 is guided into the transfer route 5 between the thermal head 12 and the platen roller 13.

A label sensor 32 is provided between the platen roller 13 and the guide roller 31.

In the thermal printer 1 and the linerless label roll-up preventing device 21 with such a configuration, the linerless label 3 which is transferred and supplied between the thermal head 12 and the platen roller 13 of the printing unit 6 is transferred by the rotation of the platen roller 13, printed with printing information according to the printing data at the thermal head 12, and directed toward the outlet 16.

Even if non-adhesiveness of the platen roller 13 deteriorates, or if the adhesive agent of the adhesive agent layer 9 on the linerless label 3 adheres to the outer circumferential surface of the platen roller 13, without the linerless label 3 heading in a direction (in dotted arrowed line in FIG. 3) where the linerless label 3 rolls-up on the platen roller 13 while being adhered to the platen roller 13, and by forcibly peeling off the tip portion of the linerless label 3 with the roll-up preventing projection edge 29 (roll-up preventing contacting surface 29A) at the arcuate fitting portion 25 of the roll-up preventing plate 23, it is possible to guide the linerless label 3 toward the outlet 16 as shown in solid arrowed line in FIG. 3.

Thus, it is possible to reliably prevent rolling-up of the printed linerless label 3 on the platen roller 13, and ensure stable transfer, printing, and issuance and discharging operations of the linerless label 3.

Furthermore, by forming the slits 22 on the platen roller 13, there is a possibility of reducing the printing pressure put upon the linerless label 3 transferred along the slit 22 portion of the roller. However, since the linerless label 3, as compared to a label with a liner, is provided with a rigidity of a predetermined level or more, and even if the linerless label 3 passes over the portion of the slits 22, there will not be much effect by the printing pressure put upon the linerless label 3. If the thermal printer 20 is portable, it does not require much printing pressure, and together with some ingenuity of the print pattern, etc., it will not cause any problem in the printing performance.

The invention claimed is:

1. A label roll-up preventing device for a printer which prints a label,
   - the printer having a rotatable platen roller and an opposing print head and a printer body configured to advance a label to be printed between the rotatable platen roller and the print head, to be printed by the print head; and the platen roller being configured to transfer the label with rotation of the platen roller,
   - the label roll-up preventing device comprising:
   - a roll-up preventing plate capable of fixing at a radial peripheral surface of the platen roller, relatively to the rotating platen roller, the plate having;
   - a roll-up preventing projection edge at a portion of the roll-up preventing plate, the edge projecting out from the outer circumferential surface of the platen roller, and the edge being positioned and configured for contacting the back surface of the linerless label advancing past the platen roller;
   - a rotating shaft of the platen roller, an arcuate fitting portion, which is fitted to the rotating shaft of the platen roller and is configured to permit rotation of the rotating shaft, the arcuate fitting portion having an exterior portion which forms the roll-up preventing projection edge, the edge is located at a downstream side of a contacting portion of the print head and the platen roller between the print head and the platen roller; and
   - a pair of right and left fixing ends, located at both ends of the arcuate fitting portion, and configured for fixing the roll-up preventing plates relatively to the platen roller.

2. The label roll-up preventing device of a printer according to claim 1, wherein
   - a first one of the fixing ends includes a first fixing end projecting out from the outer circumferential surface of the platen roller in a direction different from the projecting direction of the roll-up preventing projection edge, and configured for preventing forward direction rotation of the roll-up preventing plate against forward direction rotation of the platen roller; and
   - a second one of the fixing ends projecting from the outer circumferential surface of the platen roller in a direction different from the projecting direction of the roll-up preventing projection edge, and configured for preventing counter rotation of the roll-up preventing plate against the counter rotation of the platen roller.

3. The label roll-up preventing device of a printer according to claim 1, wherein the roll-up preventing projection edge has
   - a roll-up preventing contacting surface along a transfer direction of the label between the thermal head and the platen roller.

4. The label roll-up preventing device of a printer according to claim 1, further comprising a slit in the outer circumferential surface of and extending around the platen roller and the roll-up preventing plate being held at the slit.

5. The label roll-up preventing device of a printer according to claim 4, wherein the slit extends to the outer circumferential surface of the rotating shaft of the platen roller from the outer circumferential surface of the platen roller.

6. The label roll-up preventing device of a printer according to claim 4, wherein a pair of the slits is formed at positions evenly located on right and left sides of the platen roller in the axial direction, and a respective roll-up preventing plate is provided at each of the respective slits.

7. The label roll-up preventing device according to claim 1, wherein the label is a linerless label formed with an adhesive agent layer on a back side of a label base member and a separating agent layer on a surface of the label base member, the label being oriented such that the back side is toward the platen roller.

8. The linerless label roll-up preventing device of a printer according to claim 1, wherein the print head is a thermal printer and the label is a thermal printable label.

* * * * *